(12) United States Patent
Amimoto et al.

(10) Patent No.: US 10,829,249 B2
(45) Date of Patent: Nov. 10, 2020

(54) SATELLITE CONSTELLATION FORMING METHOD AND FORMING DEVICE

(71) Applicant: IHI AEROSPACE CO., LTD., Tokyo (JP)

(72) Inventors: Junichi Amimoto, Tokyo (JP); Masanobu Fujimura, Tokyo (JP)

(73) Assignee: IHI AEROSPACE CO., LTD., Tokyo (JP)

( * ) Notice: Subject to any disclaimer, the term of this patent is extended or adjusted under 35 U.S.C. 154(b) by 359 days.

(21) Appl. No.: 16/062,293

(22) PCT Filed: Apr. 18, 2016

(86) PCT No.: PCT/JP2016/062206
§ 371 (c)(1),
(2) Date: Jun. 14, 2018

(87) PCT Pub. No.: WO2017/110105
PCT Pub. Date: Jun. 29, 2017

(65) Prior Publication Data
US 2018/0370658 A1    Dec. 27, 2018

(30) Foreign Application Priority Data

Dec. 21, 2015  (JP) ................................ 2015-248658

(51) Int. Cl.
*B64G 1/24*   (2006.01)
*B64G 1/00*   (2006.01)
*B64G 1/10*   (2006.01)

(52) U.S. Cl.
CPC ............. *B64G 1/242* (2013.01); *B64G 1/007* (2013.01); *B64G 1/1085* (2013.01)

(58) Field of Classification Search
CPC ....... B64G 1/1085; B64G 1/242; B64G 1/007
See application file for complete search history.

(56) References Cited

U.S. PATENT DOCUMENTS

| 5,199,672 | A | 4/1993 | King |
| 6,198,990 | B1 | 3/2001 | Croom |
| 9,434,485 | B1 * | 9/2016 | Lehocki ................... B64G 1/26 |
| 2002/0003192 | A1 | 1/2002 | Taormina et al. |
| 2003/0010868 | A1 | 1/2003 | McDermott |

(Continued)

FOREIGN PATENT DOCUMENTS

| JP | 3-246197 A | 11/1991 |
| JP | 2002-530004 A | 9/2002 |

(Continued)

OTHER PUBLICATIONS

International Search Report issued in PCT/JP2016/062206, completed on Jul. 29, 2016 and dated Aug. 9, 2016.

(Continued)

*Primary Examiner* — Jessica B Wong
(74) *Attorney, Agent, or Firm* — Merchant & Gould, P.C.

(57) ABSTRACT

1. A satellite constellation forming method comprises a satellite deployment step S2, a spacecraft acceleration step S4, a spacecraft orbiting step S5 and spacecraft deceleration step, and the aforementioned steps are repeated in order. In the satellite deployment step S2, deploying one of the satellites into the circular orbit 2 from the spacecraft 10 on the circular orbit 2. In the spacecraft acceleration step S4, accelerating the spacecraft 10 and switching the orbit from the circular orbit 2 to a spacecraft transfer orbit 3 in the same orbit plane. In the spacecraft orbiting step S5, making the spacecraft 10 orbit along the spacecraft transfer orbit 3 a plurality of times. In the spacecraft deceleration step, decelerating the spacecraft 10 and switching the orbit from the spacecraft transfer orbit 3 to the circular orbit 2 in the same orbit plane.

4 Claims, 9 Drawing Sheets

(56) References Cited

U.S. PATENT DOCUMENTS

| | | |
|---|---|---|
| 2006/0016934 A1 | 1/2006 | Sharer |
| 2006/0241824 A1 | 10/2006 | Kawaguchi et al. |
| 2009/0230249 A1* | 9/2009 | Geneste ................. B64G 1/007 244/158.5 |
| 2015/0083865 A1 | 3/2015 | Nakasone |

FOREIGN PATENT DOCUMENTS

| | | |
|---|---|---|
| JP | 2006-188149 A | 7/2006 |
| WO | 2015/041733 A1 | 3/2015 |

OTHER PUBLICATIONS

Written Opinion issued in PCT/JP2016/062206, dated Aug. 9, 2016.
Search Report issued in Russian patent application 2018126737, completed on May 8, 2019.
Office Action issued in Russian patent application 2018126737, dated May 14, 2019.
V.I. Levantovsky, Mechanics of space flight in elementary presentation. "The science". M., 1970, pp. 106-107 (Fig. 35).
V.G. Balakhontsev, V.A. Ivanov, V.I. Shabanov. Rendezvousing in space. Military Publishing, M., 1973, pp. 67-71, 76-77 (Fig. 3,6).
Extended European Search Report issued in corresponding application 16878008.8 completed on Oct. 24, 2018 and dated Nov. 6, 2018.
Office Action issued in co-pending Russian application 2018126737/11 (042477) dated Sep. 19, 2019.
Cosmonautics: Encyclopedia / Editor-in-Chief V.P. Glushko. Moscow: Publishing house "Soviet Encyclopedia", 1985. p. 304, with machine translation, cited in the Office Action (NPL01) above.

* cited by examiner

Prior Art

FIG. 8B

Prior Art

SATELLITE CONSTELLATION FORMING METHOD AND FORMING DEVICE

This is a National Phase Application in the United States of International Patent Application No. PCT/JP2016/062206 filed Apr. 18, 2016, which claims priority on Japanese Patent Application No. 2015/248658, filed Dec. 21, 2015. The entire disclosures of the above patent applications are hereby incorporated by reference.

TECHNICAL FIELD

The present invention relates to forming method and forming device for a satellite constellation which is configured by a plurality of satellites on the same circular orbit.

BACKGROUND ART

The "satellite constellation" means to inject a plurality of artificial satellites into a system-designed orbit and to make the satellites perform a cooperative operation.

For example, many artificial satellites are injected into a low orbit or a middle orbit in such a manner that communication ranges thereof do not mutually overlap and are operated covering the whole Earth's surface, and thereby it becomes possible to utilize the satellites for observation of the Earth, satellite phones, GPS and so forth.

The "satellite constellation" is disclosed in, for example, Patent Literature 1.

CITATION LIST

Patent Literature

PTL 1: Japanese Unexamined Patent Application Publication (Translation of PCT Application) No. 2002-530004

SUMMARY OF INVENTION

Technical Problem

For example, in a case where every 5 artificial satellites (in the following, simply called the satellites) are disposed at almost equal intervals on 6 circular orbits which run circularly passing over the North Pole and the South Pole at low altitudes, it is possible to cover and observe the whole Earth's surface by 30 (=6×5) satellites in total.

In this case, one circular orbit will be located almost every 2 hours over a specific latitude and one satellite will be located almost every 19 minutes over a specific longitude.

For formation of the above-described satellite constellation, for example, the plurality of satellites are loaded on one rocket and, on a predetermined circular orbit, the plurality of satellites are deployed from the rocket onto the circular orbit.

The respective satellites are accelerated and fly along different transfer orbits (elliptical orbits) respectively after deployed, and then after elapse of mutually different times, are decelerated and become the satellites located at different positions on the same circular orbit respectively.

However, in a case where the 5 satellites are to be disposed at equal intervals on, for example, the same circular orbit, a maximum periodic difference between the satellites reaches about 76 minutes (=19×4) in order to obtain a periodic difference (for example, about 19 minutes) of the respective satellites. Since the first satellite flies along transfer orbits which are far in apogee by that amount, a large amount of fuel is necessary for acceleration and deceleration.

As a result, in the above-described existing method, it is necessary to load the fuel used for flying along the respective transfer orbits onto the respective satellites and the total fuel thereof becomes excessive.

The present invention has been conceived in order to solve the above-described issues. That is, an object of the present invention is to provide satellite constellation forming method and forming device capable of greatly reducing the fuel (a propellant) to be loaded onto the respective satellites and capable of greatly reducing also the total amount of the propellant which is necessary for formation of the satellite constellation.

Solution to Problem

According to the present invention, there is provided a satellite constellation forming method of injecting a spacecraft onto which a plurality of satellites are loaded into a circular orbit and forming a satellite constellation which is configured by the plurality of satellites on the circular orbit, having (A) the satellite deployment step of deploying one of the satellites into the circular orbit from the spacecraft on the circular orbit, (B) the spacecraft acceleration step of accelerating the spacecraft and switching the orbit from the circular orbit to a spacecraft transfer orbit in the same orbit plane, (C) the spacecraft orbiting step of making the spacecraft orbit along the spacecraft transfer orbit a plurality of times, and (D) the spacecraft deceleration step of decelerating the spacecraft and switching the orbit from the spacecraft transfer orbit to the circular orbit in the same orbit plane, wherein the aforementioned (A) to (D) are repeated in order.

In the aforementioned (C), the number of times that the spacecraft orbits is set in such a manner that a periodic difference between the preceding satellite and the following satellite reaches a set time.

An altitude of apogee of the spacecraft transfer orbit is set to 1.05 times to 1.6 times an altitude of the circular orbit.

In addition, according to the present invention, there is provided a satellite constellation forming device which performs the satellite constellation forming method comprising a spacecraft having a satellite loading and deployment device which loads and deploys the plurality of satellites in order, a spacecraft propulsion device which makes acceleration and deceleration possible on an orbit, and a spacecraft control device which controls the satellite loading and deployment device and the spacecraft prolusion device.

Advantageous Effects of Invention

According to the present invention, after deployment of one satellite into the circuit orbit, the spacecraft is accelerated and the orbit is switched to the spacecraft transfer orbit until the next satellite is deployed into the same circular orbit, and after orbiting along the spacecraft transfer orbit a plurality of times, the spacecraft is decelerated and the orbit is switched to the circular orbit.

Since the respective satellites fly along the circuit orbit as they are with no acceleration or deceleration on the circular orbit into which the satellites are deployed from the spacecraft, acceleration and deceleration of the respective satellites are substantially unnecessary and it is possible to more greatly reduce the fuel (the propellant) to be loaded onto the respective satellites than ever.

It is possible to set the periodic difference between the two adjacent satellites depending on the number of times that the spacecraft orbits and no propellant is necessary for this orbiting. In addition, since the spacecraft orbits along the spacecraft transfer orbit the plurality of times, it is possible to set the spacecraft transfer orbit to the vicinity of the circular orbit and it is possible to reduce the fuel (the propellant) necessary for acceleration and deceleration of the spacecraft.

Therefore, according to the present invention, it is possible to deploy the following satellite into the same circular orbit with an appropriate periodic difference by accelerating and decelerating the spacecraft one time. Thereby, it is possible to deploy the 5 satellites and to form the satellite constellation by accelerating and decelerating the spacecraft, for example, four times and it is possible to more greatly reduce the total amount of the propellant which is necessary for formation of the satellite constellation than ever.

DESCRIPTION OF EMBODIMENTS

In the following, an embodiment of the present invention will be described in detail on the basis of the appended drawings. Incidentally, the same symbols are assigned to parts which are common among the respective drawings and duplicated description thereof is omitted.

Figure 1A:
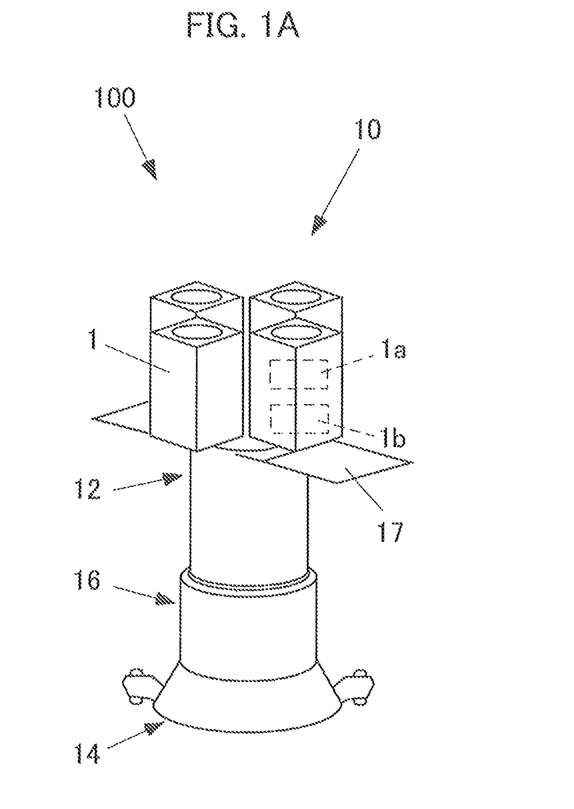
FIG. 1A is a general view of a spacecraft which configures a satellite constellation forming device of the present invention.
Figure 1B:
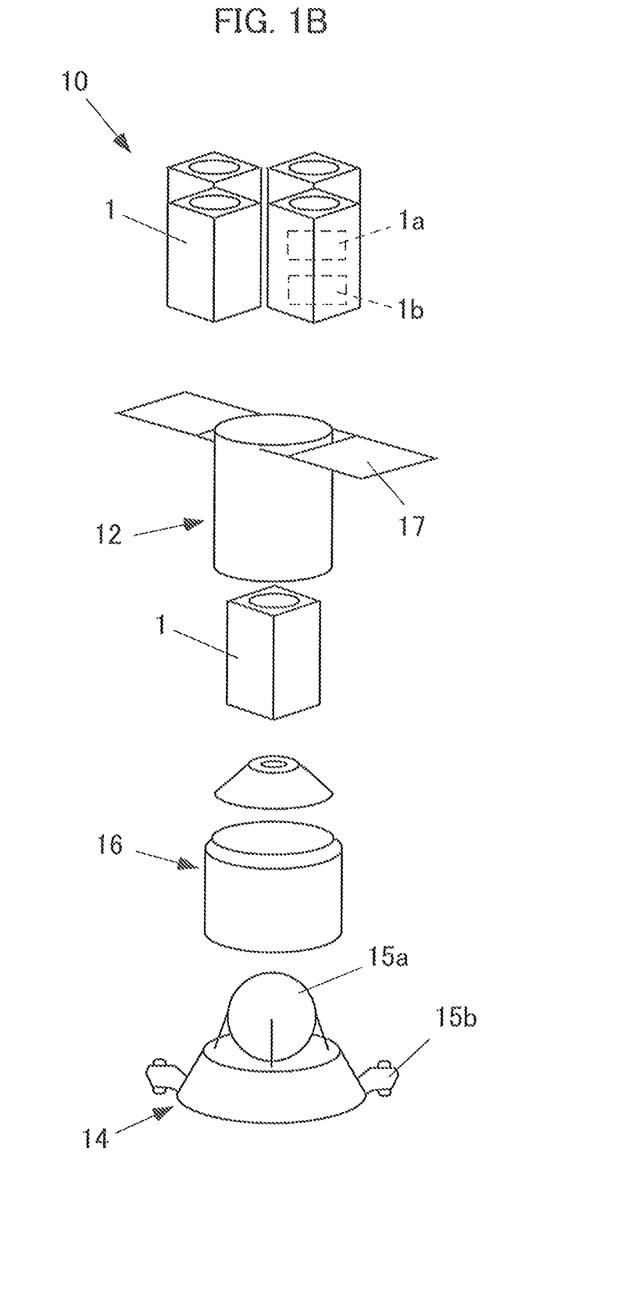
FIG. 1B is an exploded diagram of the spacecraft.

FIG. 1A is a general view of a spacecraft 10 which configures a satellite constellation forming device 100 of the present invention and FIG. 1B is an exploded diagram of the spacecraft 10.

In FIG. 1A and FIG. 1B, the spacecraft 10 has a satellite loading and deployment device 12, a spacecraft propulsion device 14 and a spacecraft control device 16.

The satellite loading and deployment device 12 is loaded with a plurality (5 units in this example) of satellites 1 and has a function of deploying the respective satellites 1 in order.

The spacecraft propulsion device 14 has, for example, a fuel tank 15a and a gas injection device 15b and is configured to inject a propulsion gas to the front and the rear of the spacecraft 10 to make acceleration and deceleration possible on an orbit.

The spacecraft control device 16 has, for example, a solar battery panel 17, a power source device and a communication device and controls the satellite loading and deployment device 12 and the spacecraft propulsion device 14 in communication with the ground or the respective satellites 1.

It is preferable that the satellite 1 be a small-sized satellite onto which a propulsion device for acceleration or deceleration and a fuel (a propellant) are not loaded.

Figure 2:
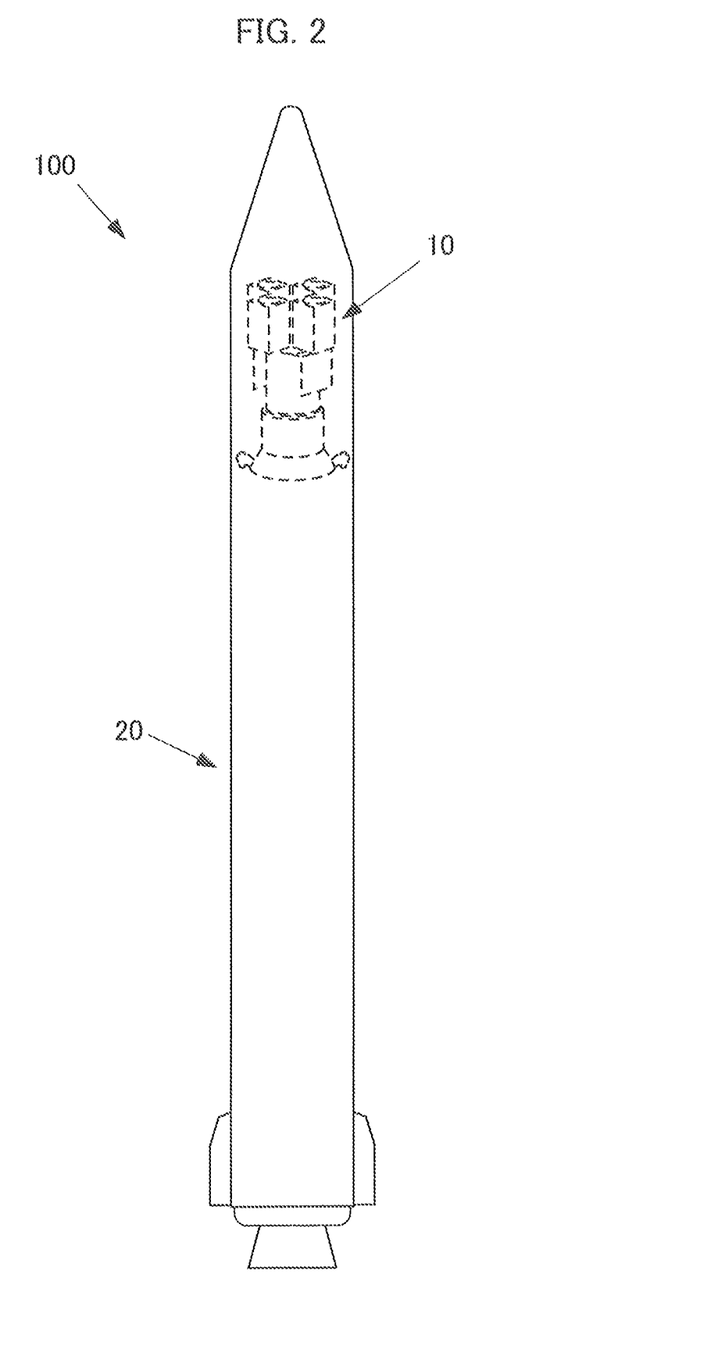
FIG. 2 is a general view of a rocket which injects the spacecraft into a circular orbit.

FIG. 2 is a general view of a rocket 20 which projects the spacecraft 10 into a circular orbit 2.

The rocket 20 has a plural-stage (for example, three-stage) solid motor and has a function of transporting the above-described spacecraft 10 to the predetermined circular orbit 2 and projecting the spacecraft 10 into the circular orbit 2.

Figure 4:
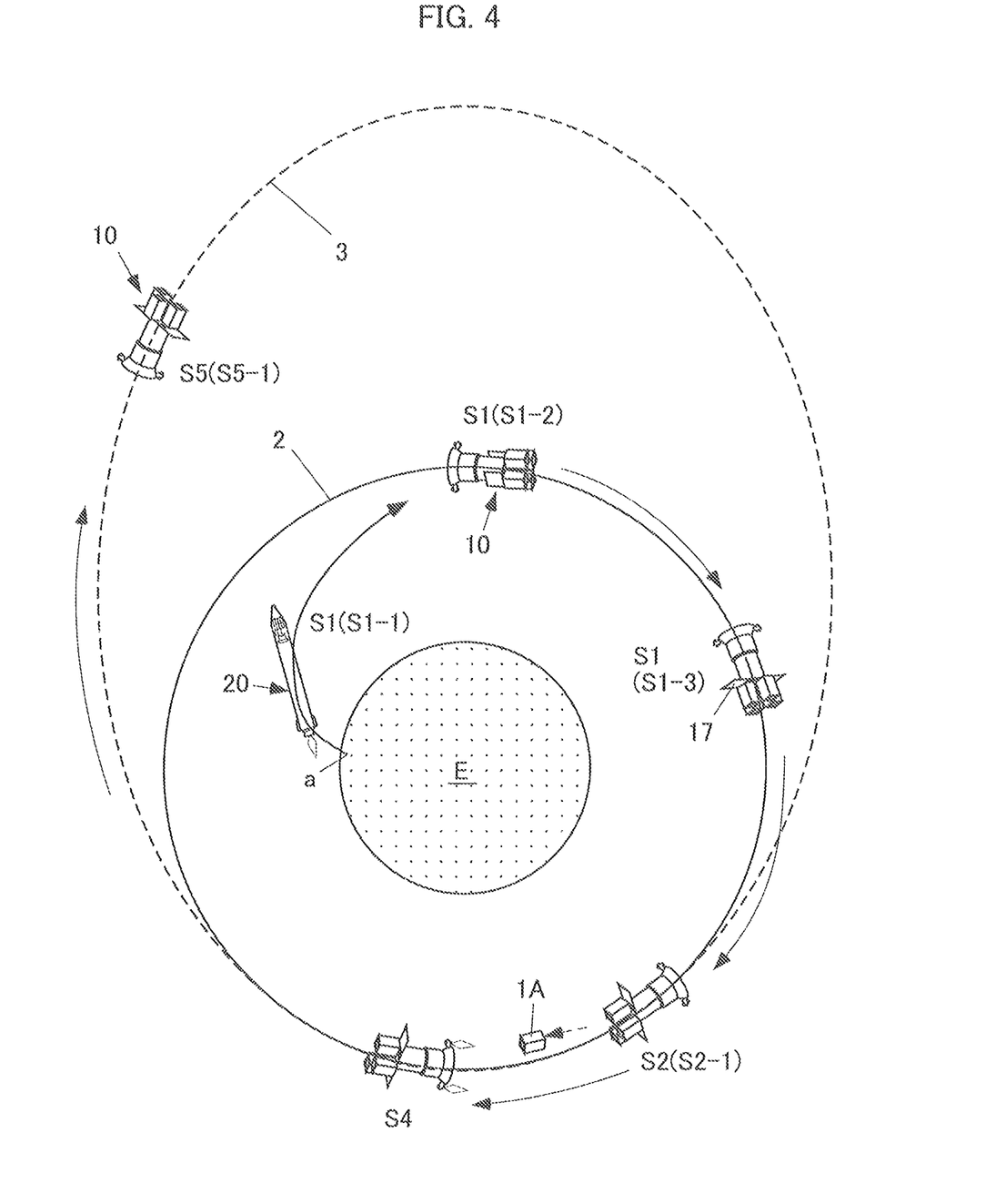
FIG. 4 is an explanatory diagram ranging from rocket launching to spacecraft orbiting step of the method of the present invention.

A sun-synchronous orbit which runs circularly, for example, passing over the North Pole and the South Pole at a low altitude (an altitude of 500 to 700 km) and so forth are conceived as the predetermined circular orbit 2 (see FIG. 4).

Figure 3:
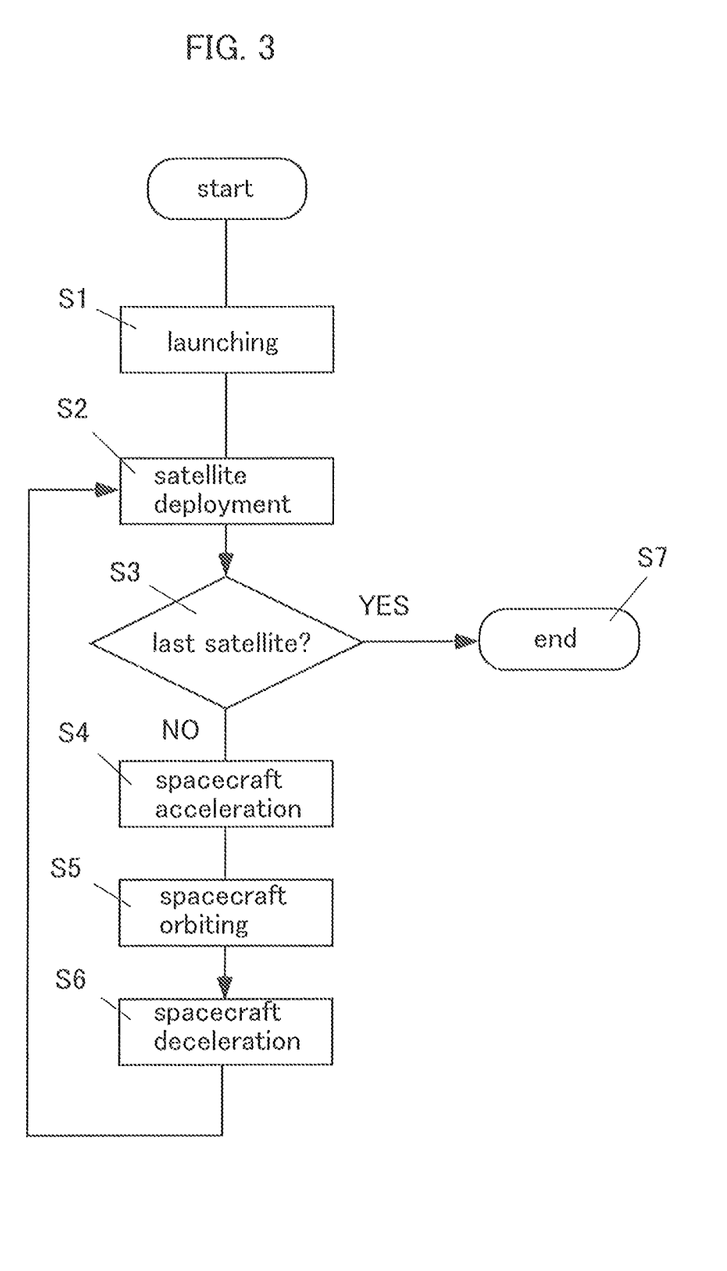
FIG. 3 is an overall flowchart of a satellite constellation forming method of the present invention.

FIG. 3 is an overall flowchart of a satellite constellation forming method (in the following, simply called the "forming method") of the present invention. In this drawing, the forming method of the present invention is configured by respective steps (processes) S1 to S7.

Figure 5:
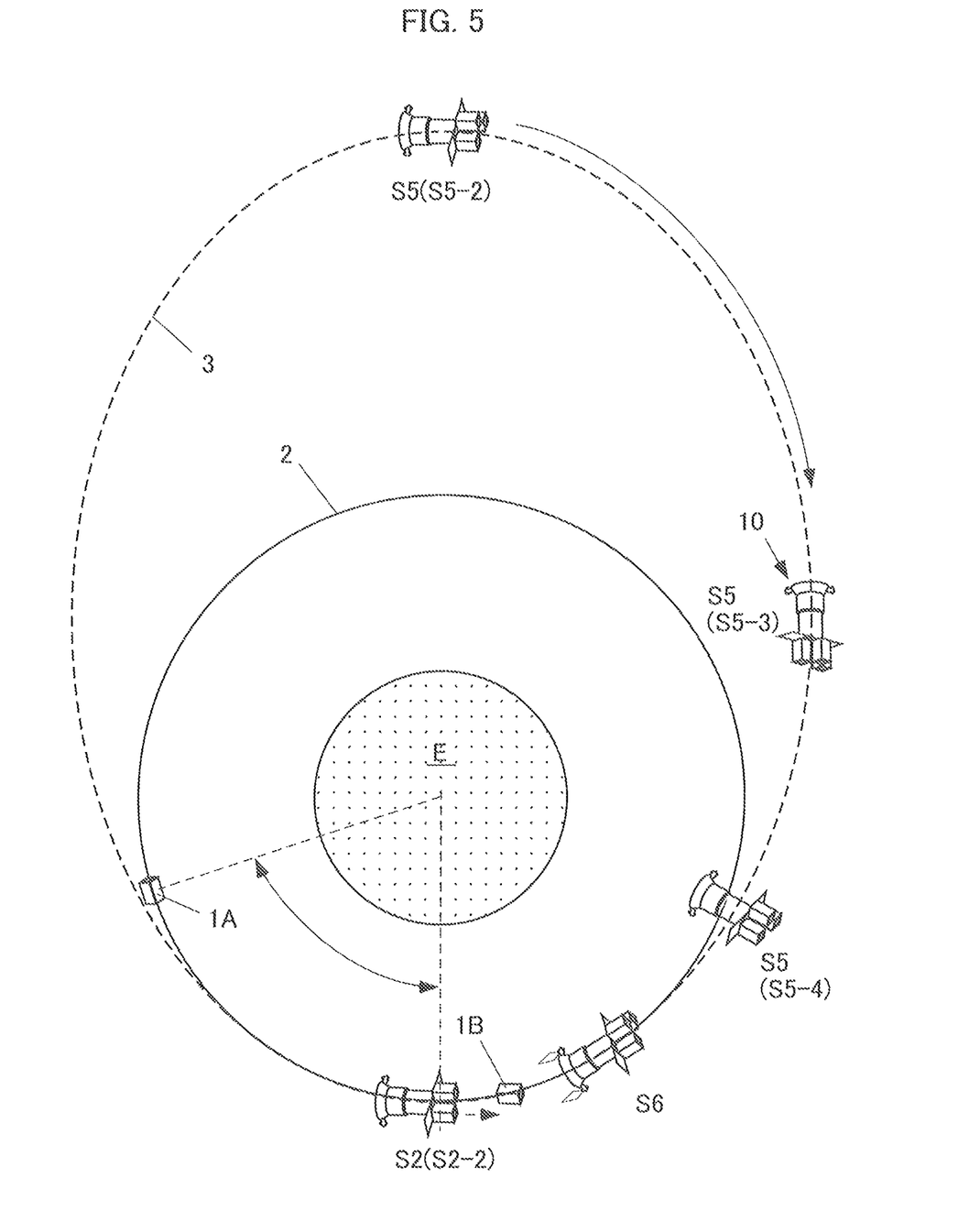
FIG. 5 is an explanatory diagram ranging from spacecraft orbiting step to second satellite deployment step of the method of the present invention.
Figure 6:
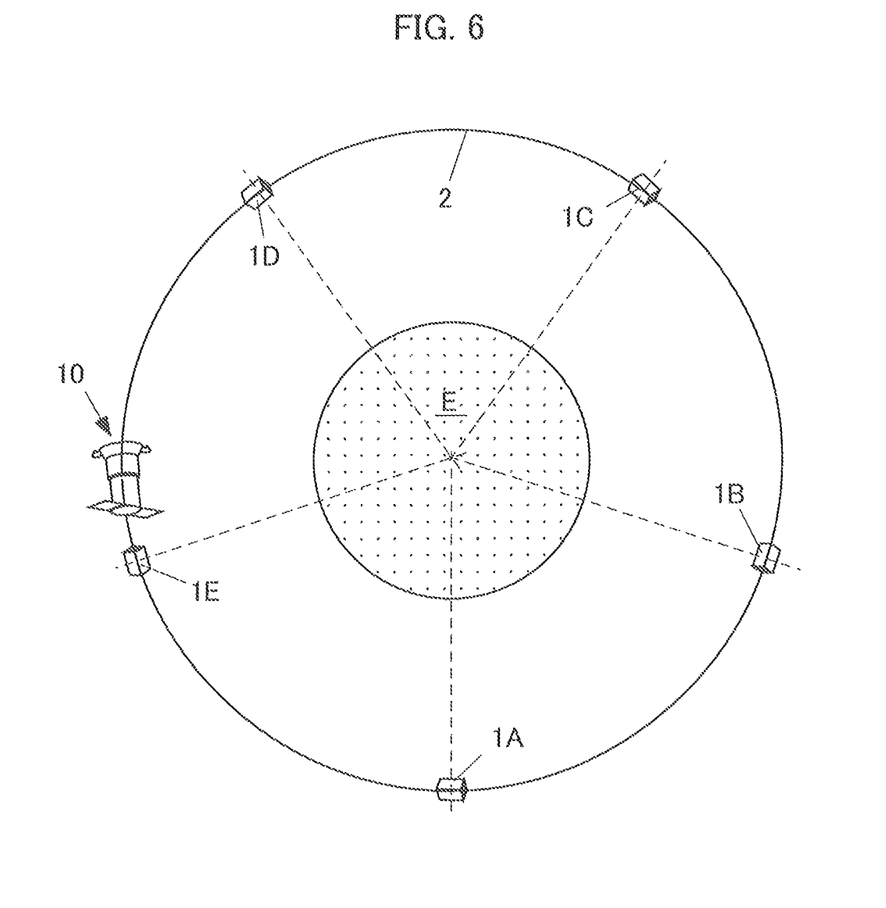
FIG. 6 is an explanatory diagram at completion of the satellite constellation by the method of the present invention.

FIG. 4 to FIG. 6 are explanatory diagrams of the forming method of the present invention. In the drawings, FIG. 4 is the explanatory diagram ranging from launching of the rocket 20 to spacecraft orbiting step S5, FIG. 5 is the explanatory diagram ranging from spacecraft orbiting step S5 to second satellite deployment step S2 (S2-2) and FIG. 6 is the explanatory diagram at completion of the satellite constellation.

In the following, the forming method of the present invention will be described using FIG. 3 to FIG. 6.

In launching step S1, the spacecraft 10 is launched from a point a on the Earth E in FIG. 4 by the rocket 20 (S1-1) and the spacecraft 10 is projected into the circular orbit 2 in step (S1-2). Then, the solar battery panel 17 is unfolded in step (S1-3).

In satellite deployment step S2, on the circular orbit 2, one satellite 1 (a first satellite 1A in this example) is deployed from the spacecraft 10 into the circular orbit 2 (S2-1).

In step S3 in FIG. 3, in a case where the deployed satellite 1 is not the last satellite 1 (a fifth satellite 1E in this example) (NO), the spacecraft 10 is accelerated and the orbit is switched from the circular orbit 2 to a spacecraft transfer orbit 3 in the same orbit plane in spacecraft acceleration step S4.

It is preferable to set the spacecraft transfer orbit 3 to the vicinity of the circular orbit 2. For example, it is good to set an altitude of apogee of the spacecraft transfer orbit 3 to about 1.05 times to 1.6 times an altitude of the circular orbit 2. The smaller this multiple is, the more the fuel used is reduced. An altitude of perigee of the spacecraft transfer orbit 3 is the same as that of the circular orbit 2.

In the following, a case where the altitude of the circular orbit 2 is 500 km and the altitude of apogee of the spacecraft transfer orbit 3 is 559 km will be described.

In spacecraft orbiting step S5, the spacecraft 10 is caused to orbit along the spacecraft transfer orbit 3 a plurality of times. The number of times that the spacecraft 10 orbits in step S5 is set in such a manner that a periodic difference between the preceding satellite 1 (for example, the first satellite 1A) and the following satellite 1 (for example, a second satellite 1B) reaches a set time. This periodic difference is, for example, about 19 minutes and the number of times that the spacecraft 10 orbits at which this periodic difference is obtained is, for example, 31 times.

It is preferable to change the posture of the spacecraft 10 in step (S5-4) in FIG. 5 while this orbiting is being performed thereby to make deceleration of the spacecraft 10 possible.

Incidentally, in the present invention, since the spacecraft 10 is provided with the spacecraft propulsion device 14 and therefore acceleration and deceleration of the spacecraft 10 are possible on the orbit, this posture change may be omitted.

In spacecraft deceleration step S6, after predetermined orbiting of the spacecraft 10, the spacecraft 10 is decelerated and the orbit is switched from the spacecraft transfer orbit 3 to the circular orbit 2 in the same orbit plane (see FIG. 5).

Returning to satellite deployment step S2 after step S6, on the circular orbit 2, one satellite 1 (the second satellite 1B in this example) is deployed from the spacecraft 10 into the circular orbit 2 (S2-2).

Step S2 to step S6 are repeated in order until satellite deployment step S2 of the last satellite 1 (the fifth satellite 1E in this example) is terminated.

In step S3 in FIG. 3, in a case where the deployed satellite 1 is the last satellite 1 (the fifth satellite 1E) (YES), formation of the satellite constellation (FIG. 6) is terminated (completed) in step S7.

FIG. 6 illustrates the formed satellite constellation.

The above-described step S1 to step S7 are for the case where the satellite 1 is the small-sized satellite onto which the propulsion device for acceleration or deceleration and the propellant are not loaded.

In FIG. 1, the satellite 1 may be provided with a satellite propulsion device 1a and a satellite control device 1b. In this case, the satellite propulsion device 1a may make acceleration and deceleration possible one time each on the orbit.

The satellite control device 1b controls the satellite propulsion device 1a and switches the orbit by acceleration or deceleration.

EXAMPLE

A trial calculation of the above-described present invention was made under the following conditions.

The satellite constellation is configured by the 5 satellites 1. Each of the satellites 1 is the small-sized satellite onto which the propulsion device for acceleration or deceleration and the propellant are not loaded and a weight thereof is 100 kg. The altitude of the circular orbit 2 is the low orbit of 500 km. A specific impulse (ISP) which corresponds to a fuel consumption of the spacecraft is set to 215 seconds.

Figure 7:
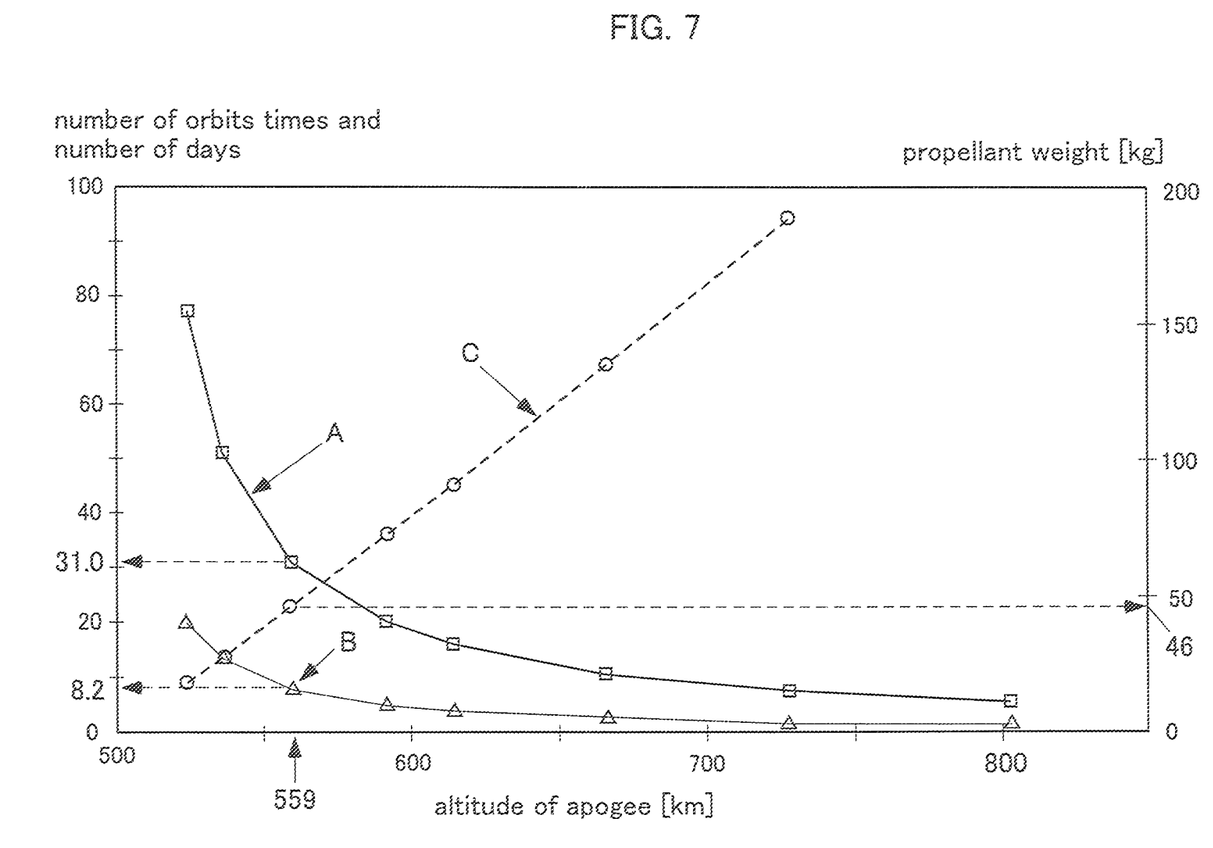
FIG. 7 is a diagram illustrating an example of a trial calculation of the present invention.

FIG. 7 is a diagram illustrating an example of the trial calculation of the present invention.

In this drawing, a horizontal axis is the altitude of apogee [km] of the spacecraft transfer orbit 3, a left-side vertical axis is the number of times [time] that the spacecraft 10 orbits and the number of days [day] which will become necessary, and a right-side vertical axis is a propellant weight [kg] of the spacecraft 10 which will become necessary.

In addition, A in the drawing is the number of times [time] that the spacecraft 10 orbits for making a target periodic difference (72°), B is the number of days [day] which is necessary from first satellite deployment step S2 (S2-1) to completion of the satellite constellation and C is the propellant weight [kg] for orbital transfer of the spacecraft 10 which is necessary until the completion of the satellite constellation.

It is seen from FIG. 7 that the higher the altitude of apogee is, the more the number of times that the spacecraft 10 orbits and the necessary number of days are reduced, but the more the propellant weight of the spacecraft 10 is increased.

In addition, it is seen from this drawing that in a case where the altitude of apogee of the spacecraft transfer orbit 3 is 559 km, the number of times that orbiting is performed reaches about 31 times, the necessary number of days reaches about 8.2 days and the propellant weight reaches about 46 kg.

That is, since, in the present invention, it is possible to set the altitude of apogee of the spacecraft transfer orbit 3 to the vicinity of the circular orbit, it is possible to suppress the propellant weight which is necessary for the spacecraft 10 to perform orbiting (acceleration and deceleration) one time to about 9 to 13 kg.

Figure 8A:
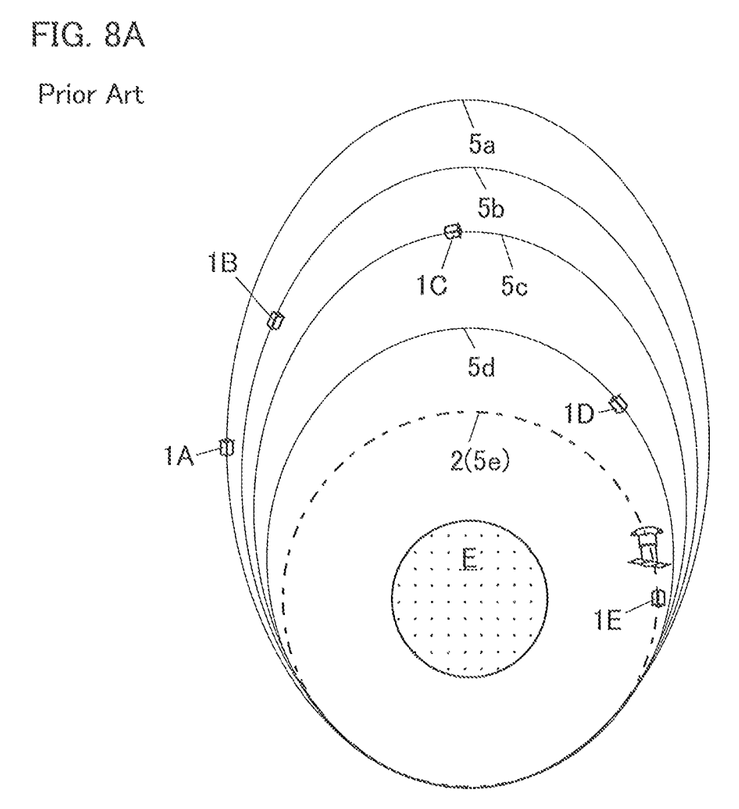
FIG. 8A is a diagram illustrating a satellite constellation formation process by an existing method.
Figure 8B:
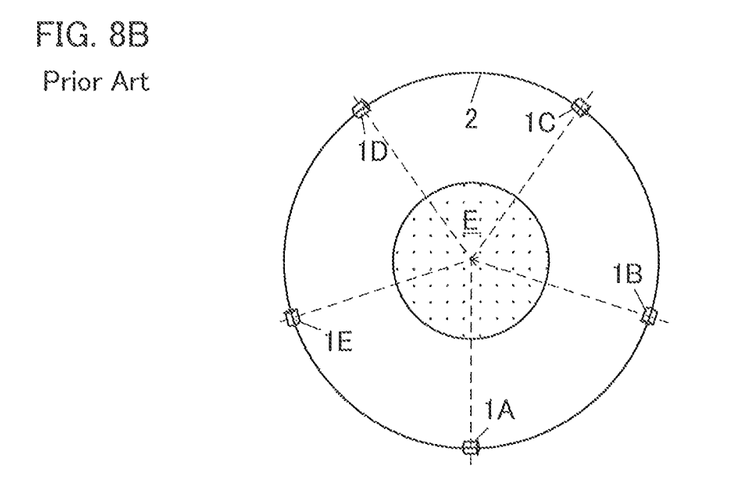
FIG. 8B is a diagram illustrating the satellite constellation completed by the existing method.

FIG. 8A is a diagram illustrating a satellite constellation forming process by an existing method and FIG. 8B is a diagram illustrating the satellite constellation completed by the existing method.

In the existing method, for example, the plurality of satellites 1 is loaded onto one rocket and, on the predetermined circular orbit 2, the plurality of satellites 1 is deployed from the rocket onto the circular orbit.

The respective satellites 1 are accelerated and fly along different transfer orbits 5a, 5b, 5c, 5d and 5e (elliptical orbits) respectively after deployed and, after elapse of respectively different times, are decelerated and become the satellites 1 (1A, 1B, 1C and 1D) located at different positions on the same circular orbit 2 respectively.

The completed satellite constellation (FIG. 8B) is the same as that in FIG. 6.

In the existing method, in a case where the five satellites 1 are to be disposed on the same circular orbit 2 at equal intervals, the periodic difference between the first and last satellites 1 reaches about 76 minutes (=19×4) in order to obtain the periodic difference (for example, about 19 minutes) of the respective satellites 1. Since the first satellite 1 (1A) flies along the transfer orbits 5a, 5b, 5c, 5d and 5e which are far in apogee by that amount, a large amount of the propellant is necessary for acceleration and deceleration.

For example, in a case of the existing method, it is necessary for the five satellites 1 to load the propellant of about 225 kg, about 155 kg, about 98 kg, about 45 kg and 0 kg for acceleration and deceleration in order from the first satellite 1A to the fifth satellite 1E under the same conditions. That is, in the case of the existing method, the weight of the propellant for orbit transfer which is necessary until the completion of the satellite constellation reaches about 523 kg under the same conditions in the trial calculation. Accordingly, it is seen that it is possible to more greatly reduce the necessary propellant weight by the present invention than ever.

According to the above-described present invention, after deployment of one satellite 1 into the circular orbit 2, the spacecraft 10 is accelerated and the orbit is switched to the spacecraft transfer orbit 3 until the next satellite 1 is deployed into the circular orbit 2, after orbiting along the spacecraft transfer orbit 3 the plurality of times, the spacecraft 10 is decelerated and the orbit is switched to the circular orbit 2.

Since the respective satellites 1 fly along the circular orbit 2 as they are without being accelerated or decelerated on the circuit orbit 2 into which the satellites 1 are deployed from the spacecraft 10, acceleration and deceleration of the respective satellites 1 are substantially unnecessary and it is possible to more greatly reduce the fuel (the propellant) to be loaded onto the respective satellites 1 than ever.

It is possible to set the periodic difference between the two adjacent satellites in accordance with the number of times that the spacecraft 10 orbits and the propellant is not necessary for this orbiting. In addition, since the spacecraft 10 orbits along the spacecraft transfer orbit 3 the plurality of times, it is possible to set the spacecraft transfer orbit 3 to the vicinity of the circular orbit 2 and it is possible to reduce the fuel (the propellant) necessary for acceleration and deceleration of the spacecraft 10.

Therefore, according to the present invention, it is possible to deploy the following satellite 1 into the same circular orbit 2 with the appropriate periodic difference by accelerating and decelerating the spacecraft 10 one time. Thereby, it is possible to deploy the five satellites 1 and to form the satellite constellation by accelerating and decelerating the spacecraft 10, for example, four times and it is possible to more greatly reduce the total amount of the propellant necessary for formation of the satellite constellation than ever.

The present invention further has the following adventitious effects.

(1) Acceleration and deceleration of the respective satellites 1 are substantially unnecessary and it is possible to more greatly reduce the size and the weight of the respective satellites 1 than ever.

(2) Since the propellant weight for orbit transfer of the spacecraft 10 is greatly reduced, it is possible to greatly reduce the size and the weight of the spacecraft 10.

(3) Since a payload of the rocket 20 is reduced, it is possible to reduce the size of the rocket 20 necessary for the same mission. Alternatively, it is possible to execute a larger number of missions by the same rocket 20.

Incidentally, it goes without saying that the present invention is not limited to the above-described embodiment and various modifications may be added within a range not deviating from the gist of the present invention.

REFERENCE SIGNS LIST a point
E the Earth
1 satellite
1a satellite propulsion device
1b satellite control device
1A first satellite
1B second satellite
1C third satellite
1D fourth satellite
1E fifth satellite
2 circular orbit
3 spacecraft transfer orbit
5a, 5b, 5c, 5d, 5e transfer orbit
10 spacecraft
12 satellite loading and deployment device
14 spacecraft propulsion device
15a fuel tank
15b gas injection device
16 spacecraft control device
17 solar battery panel
20 rocket
100 satellite constellation forming device

The invention claimed is:

1. A satellite constellation forming method of injecting a spacecraft onto which a plurality of satellites are loaded into a circular orbit and forming a satellite constellation which is configured by the plurality of satellites on the circular orbit, having:
(A) a satellite deployment step of deploying one of the satellites into the circular orbit from the spacecraft on the circular orbit;
(B) a spacecraft acceleration step of accelerating the spacecraft and switching the orbit from the circular orbit to a spacecraft transfer orbit in the same orbit plane;
(C) a spacecraft orbiting step of making the spacecraft orbit along the spacecraft transfer orbit a plurality of times; and
(D) a spacecraft deceleration step of decelerating the spacecraft and switching the orbit from the spacecraft transfer orbit to the circular orbit in the same orbit plane, wherein
the aforementioned (A) to (D) are repeated in order.

2. The satellite constellation forming method according to claim 1, wherein
in the aforementioned (C), the number of times that the spacecraft orbits is set in such a manner that a periodic difference between the preceding satellite and the following satellite reaches a set time.

3. The satellite constellation forming method according to claim 1, wherein
an altitude of apogee of the spacecraft transfer orbit is set to 1.05 times to 1.6 times an altitude of the circular orbit.

4. A satellite constellation forming device which performs the satellite constellation forming method according to claim 1 comprising:
a spacecraft having
a satellite loading and deployment device which loads and deploys the plurality of satellites in order,
a spacecraft propulsion device which makes acceleration and deceleration possible on an orbit, and
a spacecraft control device which controls the satellite loading and deployment device and the spacecraft prolusion device.

* * * * *